(12) United States Patent
Shirai

(10) Patent No.: US 12,388,313 B2
(45) Date of Patent: Aug. 12, 2025

(54) ROTARY ELECTRIC MACHINE AND ELECTRIC ACTUATOR

(71) Applicant: NIDEC POWERTRAIN SYSTEMS CORPORATION, Kanagawa (JP)

(72) Inventor: Hiroshi Shirai, Kanagawa (JP)

(73) Assignee: NIDEC POWERTRAIN SYSTEMS CORPORATION, Kanagawa (JP)

( * ) Notice: Subject to any disclaimer, the term of this patent is extended or adjusted under 35 U.S.C. 154(b) by 211 days.

(21) Appl. No.: 18/469,566

(22) Filed: Sep. 19, 2023

(65) Prior Publication Data

US 2024/0106295 A1   Mar. 28, 2024

(30) Foreign Application Priority Data

Sep. 22, 2022   (JP) ................. 2022-151359

(51) Int. Cl.
*H02K 3/50*   (2006.01)
*H02K 3/52*   (2006.01)
*H02K 5/22*   (2006.01)

(52) U.S. Cl.
CPC .............. *H02K 3/50* (2013.01); *H02K 3/52* (2013.01); *H02K 5/225* (2013.01); *H02K 2203/06* (2013.01)

(58) Field of Classification Search
CPC ........ H02K 5/225; H02K 11/30; H02K 11/33; H02K 3/52; H02K 3/50; H02K 3/522; H02K 2211/03; H02K 2203/06

USPC .................................................. 310/71, 68 R
See application file for complete search history.

(56) References Cited

U.S. PATENT DOCUMENTS

| 11,342,805 | B2 | 5/2022 | Ogawa et al. | |
| 2016/0036306 | A1* | 2/2016 | Yamasaki | H02K 5/225 310/71 |
| 2022/0224195 | A1* | 7/2022 | Matsuda | H02K 9/227 |

FOREIGN PATENT DOCUMENTS

WO   2018168090   9/2018

* cited by examiner

*Primary Examiner* — Alexander A Singh
(74) *Attorney, Agent, or Firm* — JCIPRNET

(57) ABSTRACT

A rotary electric machine includes a conductive member attached to a substrate surface on an other axial side. The conductive member has a connection part electrically connected with the substrate and a holding part having multiple elastic support pieces. A first penetration part axially penetrates through the connection part. A second penetration part axially penetrates through the substrate. A coil lead wire passes through the first and second penetration parts and is supported by elastic support pieces on the other axial side relative to the first penetration part. Each elastic support piece contacts an outer peripheral surface of the coil lead wire, is positioned on the axial side toward the coil lead wire, and, when elastically deformed, presses the coil lead wire against other portions in the conductive member. The holding part holds two or more coil lead wires by using the elastic support pieces.

10 Claims, 10 Drawing Sheets

ROTARY ELECTRIC MACHINE AND ELECTRIC ACTUATOR

CROSS-REFERENCE TO RELATED APPLICATION

The present invention claims priority under 35 U.S.C. § 119 to Japanese Application No. 2022-151359 filed on Sep. 22, 2022 the entire content of which is incorporated herein by reference.

FIELD OF THE INVENTION

The invention relates to a rotary electric machine and an electric actuator.

BACKGROUND

A motor including a substrate to which a coil wire is connected is known. For example, a motor may include a support member supporting a coil wire.

In the above-mentioned motor, a process of electrically connecting the coil wire to a substrate by soldering after guiding the coil wire to a through hole provided on the substrate by passing the coil wire through a hole provided on the support member is required. Comparatively, it is required that the man-hours and time required in the process of electrically connecting the coil wire to the substrate be further reduced.

SUMMARY

An aspect of a rotary electric machine according to the invention includes: a rotor, rotatable about a central axis extending in an axial direction as a center; a stator, having a plurality of coils and facing the rotor via a gap; a substrate, positioned on a side of the stator in the axial direction; and a conductive member, attached to a surface of the substrate on an other side in the axial direction. The stator has a plurality of coil lead wires extending from the coils toward the side in the axial direction. The conductive member has: a connection part, electrically connected with the substrate; and a holding part, having a plurality of elastic support pieces and connected with the connection part. The connection part has a first penetration part penetrating through the connection part in the axial direction. The substrate has a second penetration part penetrating through the substrate in the axial direction and, when viewed in the axial direction, overlapped with the first penetration part. The coil lead wire passes through the first penetration part and the second penetration part. The coil lead wires passing through the first penetration part and the second penetration part are supported by at least two elastic support pieces on the other side in the axial direction with respect to the first penetration part. Each of the at least two elastic support pieces contacts outer peripheral surfaces of the coil lead wires, is positioned on the side in the axial direction toward the coil lead wires, and, in a state of being elastically deformed, presses the coil lead wires against other portions in the conductive member. The holding part holds two or more coil lead wires by using the elastic support pieces.

Another aspect of a rotary electric machine according to the invention includes: a rotor, rotatable about a central axis extending in an axial direction as a center; a stator, having a plurality of coils and facing the rotor via a gap; a substrate, positioned on a side of the stator in the axial direction; and a conductive member, attached to a surface of the substrate on an other side in the axial direction. The stator has a coil lead wire extending from the coils toward the side in the axial direction. The conductive member has: a connection part, electrically connected with the substrate; and a holding part, having a plurality of elastic support pieces and connected with the connection part. The connection part has a first penetration part penetrating through the connection part in the axial direction. The substrate has a second penetration part penetrating through the substrate in the axial direction and, when viewed in the axial direction, overlapped with the first penetration part. The coil lead wire passes through the first penetration part and the second penetration part. The elastic support pieces include an elastic support piece group, the elastic support piece group including three or more elastic support pieces surrounding the coil lead wire. The coil lead wire is supported by the elastic support piece group on the other side in the axial direction with respect to the first penetration part. Each of the elastic support pieces included in the elastic support piece group contacts an outer peripheral surface of the coil lead wire, is positioned on the side in the axial direction toward the coil lead wire, and, in a state of being elastically deformed, presses the coil lead wire against other elastic support pieces.

An aspect of an electric actuator according to the invention includes: the rotary electric machine; and a transmission mechanism, linked with the rotor of the rotary electric machine.

The above and other elements, features, steps, characteristics and advantages of the present disclosure will become more apparent from the following detailed description of the preferred embodiments with reference to the attached drawings.

DESCRIPTION OF THE EMBODIMENTS

Each figure virtually shows a central axis J in a rotary electric machine of the embodiments described below. In the following description, the axial direction of the central axis J is simply referred to as "axial direction". The radial direction with the central axis J as the center is simply referred to as "radial direction". The circumferential direction with the central axis J as the center is simply referred to as "circumferential direction". Z-axis in each figure illustrates a direction in which the central axis J extends. In the following description, in the axial direction, the side toward which the arrow of Z-axis points (+Z side) is referred to as "upper side", and the side (−Z side) opposite to the side toward which the arrow of Z-axis points is referred to as "lower side". In the following embodiments, the upper side corresponds to "a/the side in the axial direction", and the lower side corresponds to "an/the other side in the axial direction". The upper side and the lower sides are simply expressions for describing the relative relationship of the respective parts. The actual arrangement relationship and the like may be arrangement relationships and the like other than the arrangement relationships and the like indicated by these expressions.

Figure 1:
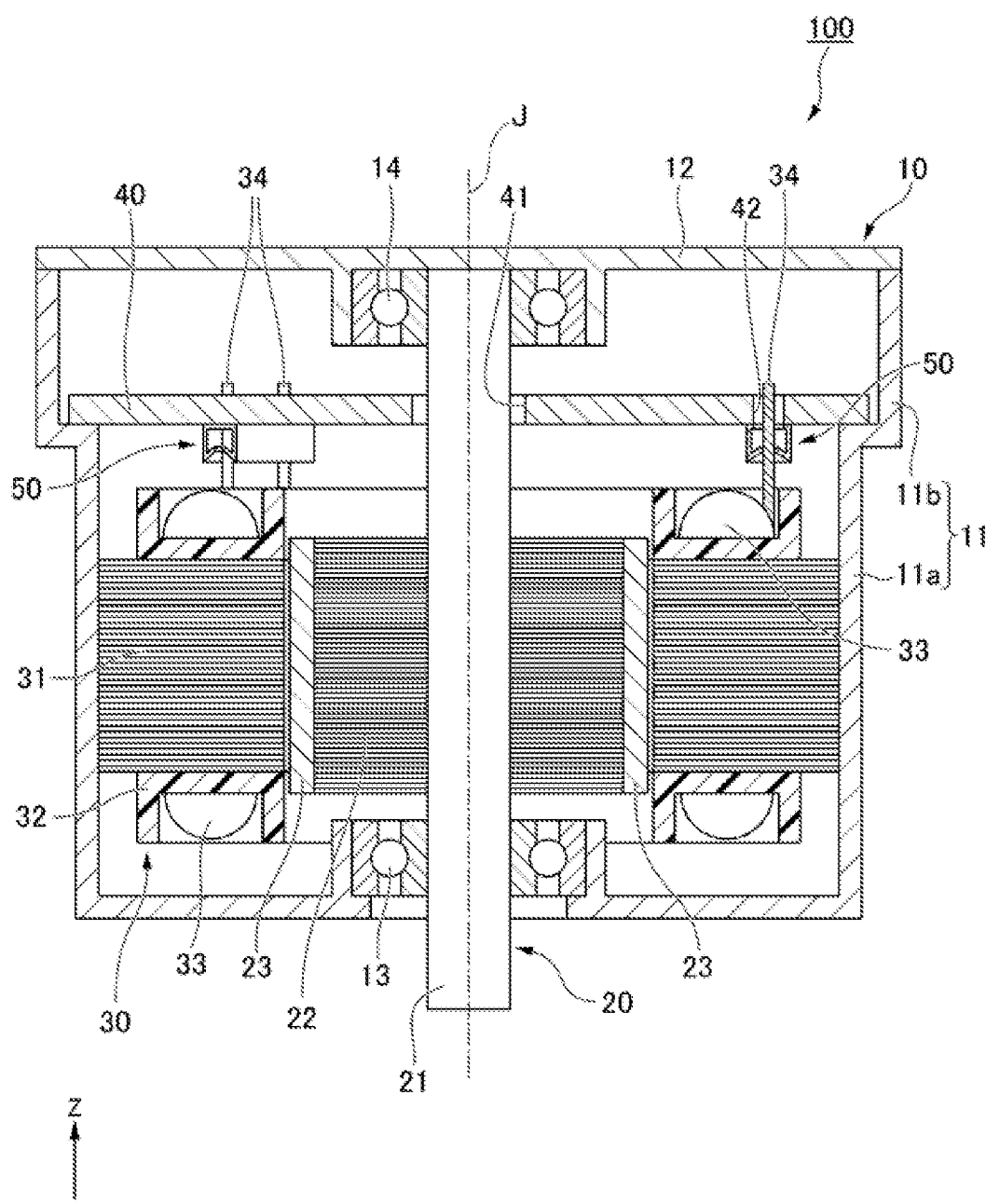
FIG. 1 is a cross-sectional view illustrating a rotary electric machine according to a first embodiment.

An electric rotary machine 100 according to the embodiment shown in FIG. 1 is a motor mounted in a vehicle. As shown in FIG. 1, the rotary electric machine 100 is an electromechanical motor. The rotary electric machine 100 includes a housing 10, a rotor 20, a stator 30, and a substrate 40. The rotor 20, the stator 30, and the substrate 40 are accommodated inside the housing 10. The housing 10 includes a housing body 11 open to the upper side and a cover member 12 blocking the opening on the upper side of the housing body 11. The housing body 11, for example, exhibits a cylindrical shape with the central axis J as the center. The housing body 11 has a stator accommodation part 11a accommodating the stator 30 inside, and a substrate accommodation part 11b accommodating the substrate 40 inside. The substrate accommodation part 11b is connected with the upper side of the stator accommodation part 11a. The inner diameter of the substrate accommodation part 11b is greater than the inner diameter of the stator accommodation part 11a.

The rotor 20 is rotatable about the central axis J as the center, the central axis J extending in the axial direction. The rotor 20 is provided with a shaft 21 extending in the axial direction, a rotor core 22 fixed to the shaft 21, and a magnet 23 fixed to the rotor core 22. Multiple magnets 23 are provided at intervals in the circumferential direction, for example. The shaft 21 is supported to be rotatable about the central axis J by using a bearing 13 held at the bottom part of the housing body 11 and a bearing 14 held at the cover member 12.

The stator 30 is disposed to face the rotor 20 via a gap. The stator 30 is positioned on the radially outer side of the rotor 20. The stator 30 is provided with a stator core 31 fixed to the inner peripheral surface of the stator accommodation part 11a, an insulator 32 attached to the stator core 31, and multiple coils 33 attached to the stator core 31 via the insulator 32. The stator core 31 surrounds the rotor core 22 and the magnets 23 from the radially outer side. The coils 33 are disposed side-by-side along the circumferential direction. The coils 33 are respectively formed by winding conductive wires.

The stator 30 is provided with multiple coil lead wires 34. The coil lead wires 34 extend to the upper side from the coils 33. In the embodiment, the coil lead wires 34 extend toward the upper side one after another from some of the coils 33. While not shown in the drawings, six coil lead wires 34 are provided, for example. The coil lead wires 34 are end parts of conductive wires forming the coils 33. The coil lead wires 34 are electrically connected with the substrate 40 via a conductive member 50 to be described afterwards.

The substrate 40 is positioned on the upper side of the stator 30. The substrate 40 expands in the radial direction. The plate surface of the substrate 40 is directed in the axial direction. More specifically, the plate surface of the substrate 40 is orthogonal to the axial direction. The substrate 40 is accommodated in the substrate accommodation part 11b. The radially outer edge of the substrate 40 is supported from the lower side by a stepped part provided between the inner peripheral surface of the stator accommodation part 11a and the inner peripheral surface of the substrate accommodation part 11b. The substrate 40 is provided with a central hole 41 penetrating through the substrate 40 in the axial direction. The shaft 21 passes through the central hole 41 in the axial direction.

Figure 2:
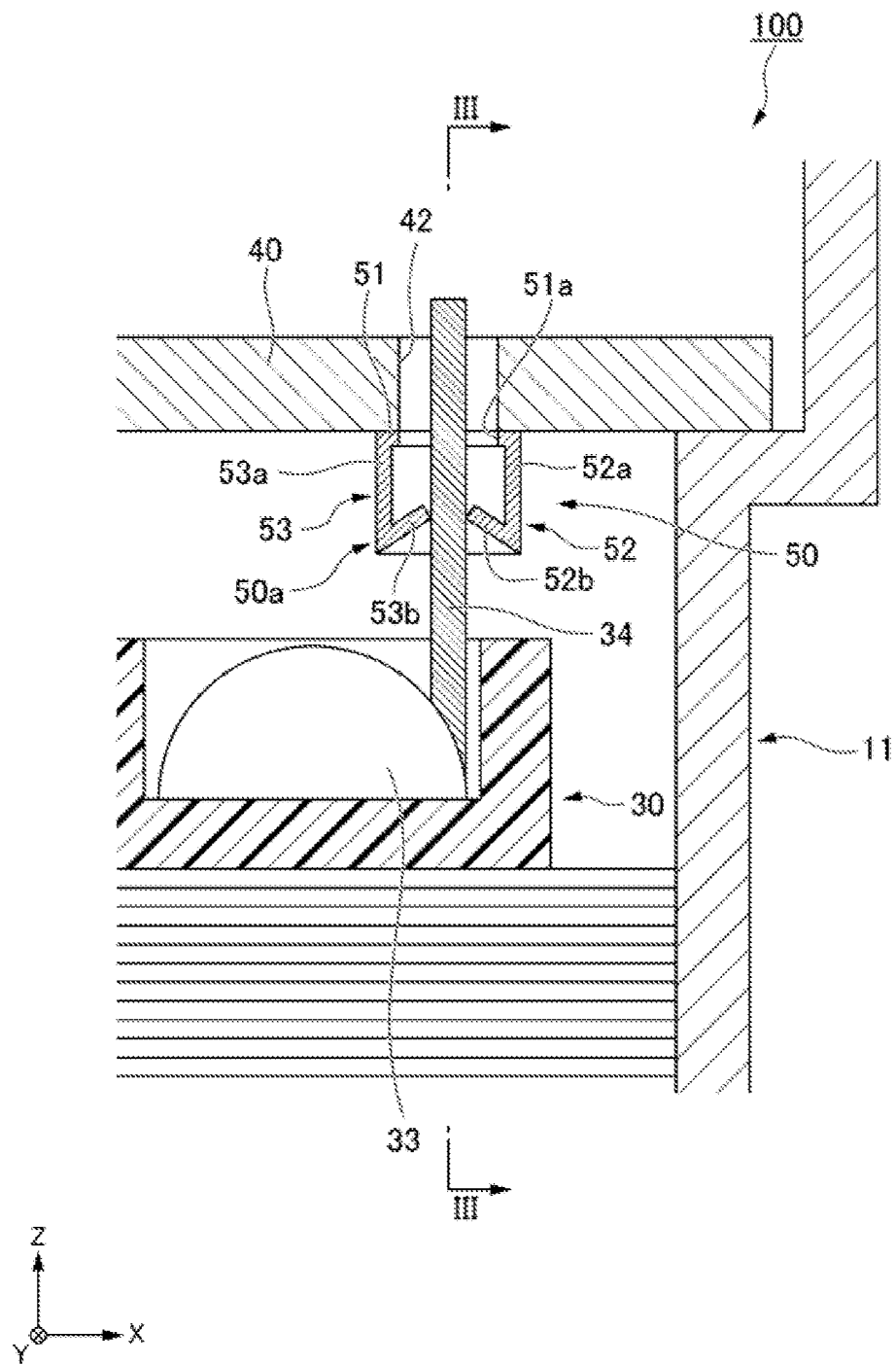
FIG. 2 is a cross-sectional view illustrating a portion of the rotary electric machine according to the first embodiment.
Figure 3:
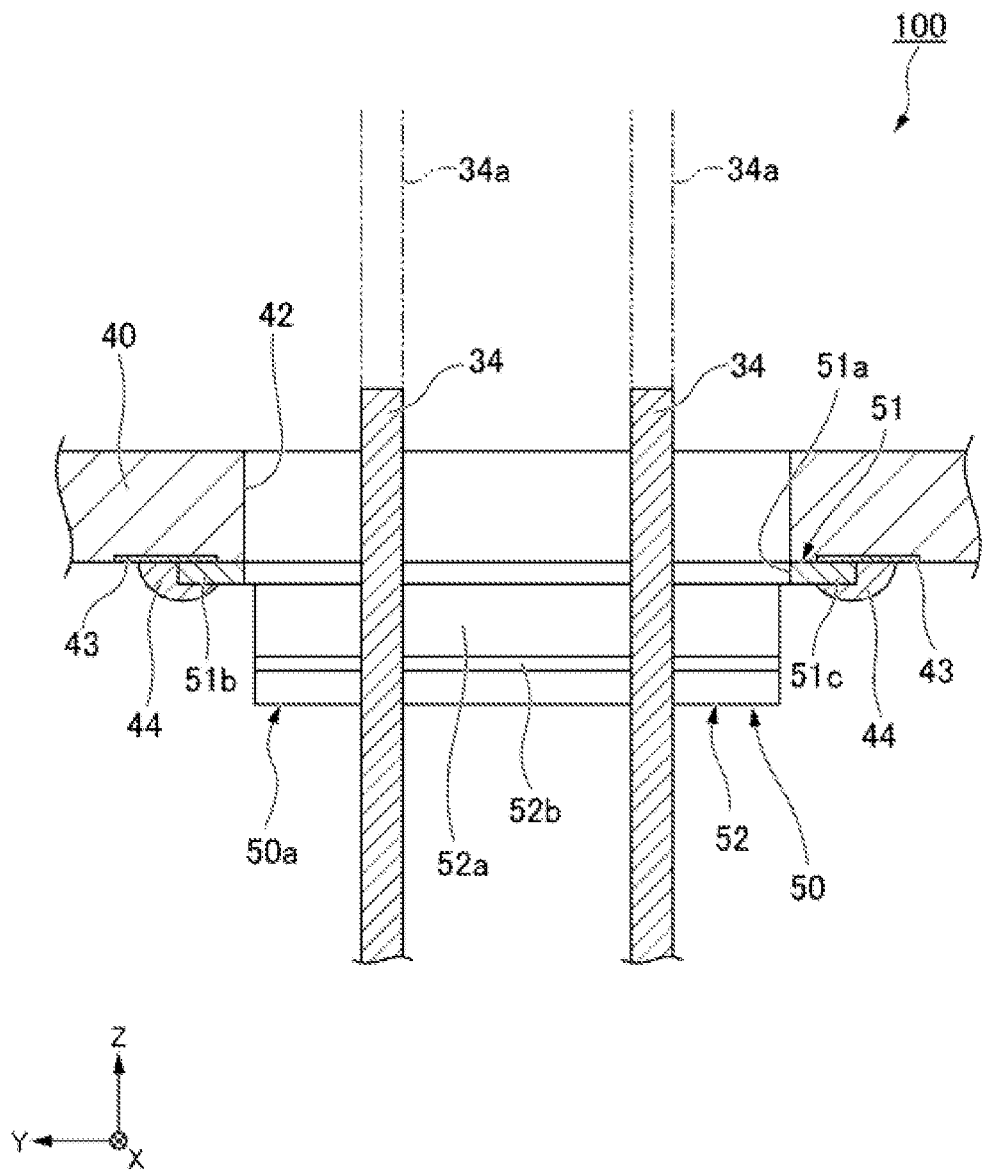
FIG. 3 is a cross-sectional view illustrating a portion of the rotary electric machine according to the first embodiment, and is a cross-sectional view taken along III-III in FIG. 2.
Figure 4:
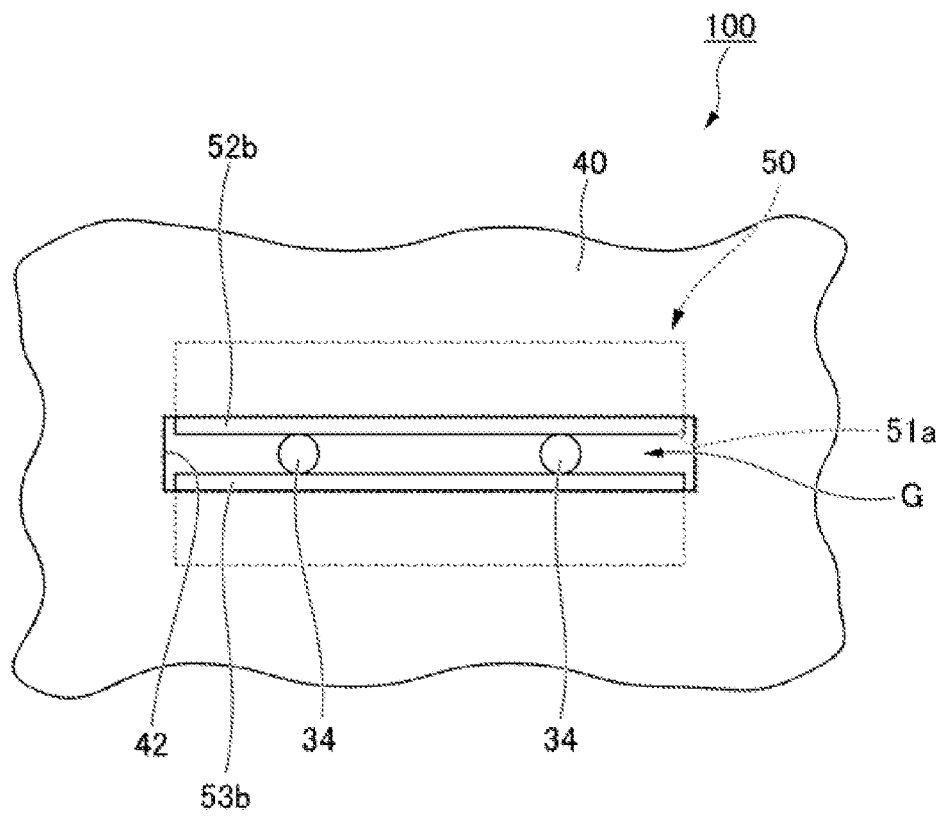
FIG. 4 is a view illustrating a portion of the rotary electric machine in the first embodiment when viewed from an upper side.

As shown in FIGS. 2 to 4, the substrate 40 has a second penetration part 42. The second penetration part 42 penetrates through the substrate 40 in the axial direction. In the embodiment, the second penetration part 42 is an elongated hole extending in a direction orthogonal to the axial direction. More specifically, the second penetration part 42 is a rectangular hole elongated in a direction orthogonal to the axial direction. Multiple second penetration parts 42 are provided at intervals in the circumferential direction. While not shown in the drawings, three second penetration parts 42 are provided, for example.

Figure 5:
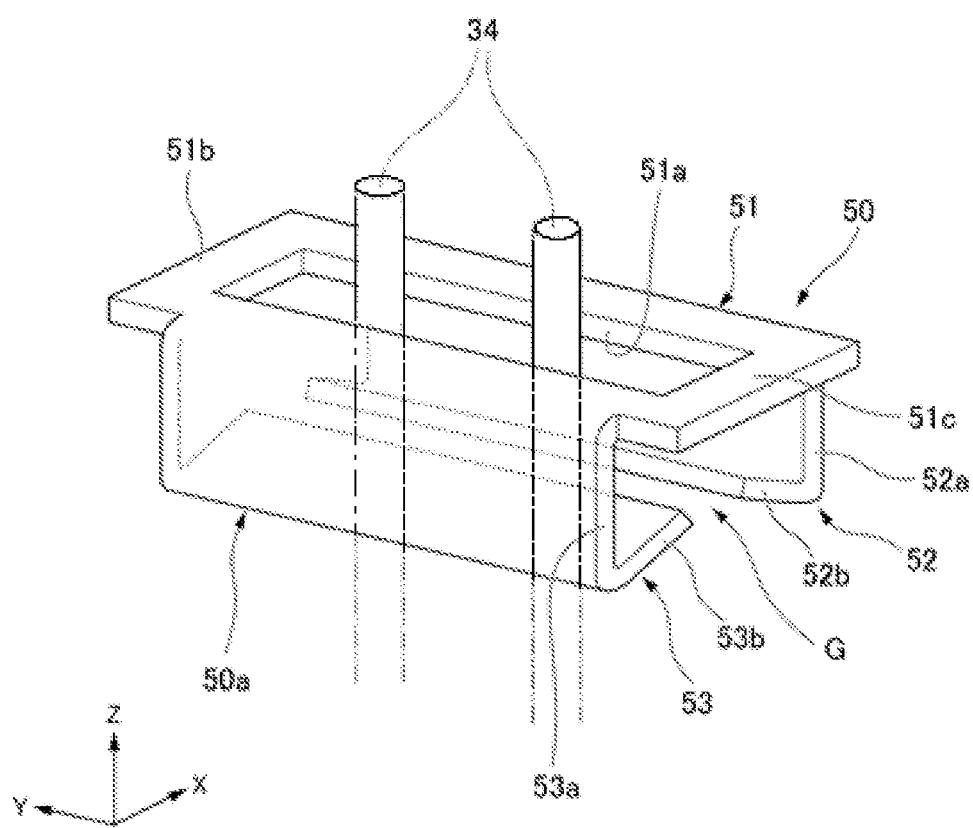
FIG. 5 is a perspective view illustrating a conductive member according to the first embodiment.

The rotary electric machine 100 includes the conductive member 50 attached to the lower side surface of the substrate 40. The conductive member 50 is a member electrically connecting the coil lead wires 34 and the substrate 40. In the embodiment, multiple conductive members 50 are provided at intervals in the circumferential direction. While not shown in the drawings, three conductive members 50 are provided, for example. The conductive member 50 is made of metal. In the embodiment, the conductive member 50 is a sheet metal member. As shown in FIG. 5, the conductive member 50 in the embodiment is in a shape elongated in a direction orthogonal to the axial direction.

In the following description, the longitudinal direction of the conductive member 50 is appropriately indicated by Y-axis in the drawings and is referred to as "longitudinal direction Y". In addition, a direction orthogonal to both the axial direction and the longitudinal direction Y of the conductive member 50 is appropriately indicated by X-axis, and is referred to as "transverse direction X". The transverse direction X and the longitudinal direction Y are directions orthogonal to the axial direction, and are directions orthogonal to each other. The transverse direction X and the longitudinal direction Y are, for example, different directions for each conductive member 50.

In the transverse direction X, the side toward which the arrow of X-axis points (+X side) is referred to as "a/the side of the transverse direction", and the side (−X side) opposite to the side toward which the arrow of X-axis points is referred to as "an/the other side of the transverse direction". In the longitudinal direction Y, the side toward which the arrow of Y-axis points (+Y side) is referred to as "a/the side of the longitudinal direction", and the side (-Y side) opposite to the side toward which the arrow of X-axis points is referred to as "an/the other side of the longitudinal direction". In the embodiment, the transverse direction X corresponds to "first direction" intersecting with the axial direction, and the longitudinal direction Y corresponds to "second direction" intersecting with the axial direction and orthogonal to the first direction.

As shown in FIG. 5, the conductive member 50 includes a connection part 51 and a holding part 50a. The connection part 51 extends in the longitudinal direction Y. The connection part 51 is in a plate shape in which the plate surface is directed in the axial direction. The plate surface of the connection part 51 is orthogonal to the axial direction. The connection part 51 in the embodiment is in a rectangular plate shape elongated in the longitudinal direction Y. As shown in FIG. 3, the connection part 51 is fixed in a state of contacting the lower side surface of the substrate 40. An end part 51b of the connection part 51 on the side (+Y side) in the longitudinal direction and an end part 51c of the connection part 51 on the other side (-Y side) in the longitudinal direction are respectively electrically connected with land parts 43 provided on the lower side surface of the substrate 40 through solders 44. Accordingly, the connection part 51 is electrically connected with the substrate 40.

The connection part 51 has a first penetration part 51a penetrating through the connection part 51 in the axial direction. In the embodiment, the first penetration part 51a is an elongated hole extending in the longitudinal direction Y. More specifically, the first penetration part 51a is a rectangular hole elongated in the longitudinal direction Y. The first penetration part 51a is positioned on the lower side of the second penetration part 42. That is, when viewed in the axial direction, the second penetration part 42 is overlapped with the first penetration part 51a. When viewed in the axial direction, the direction in which the second penetration part 42 overlapped with the first penetration part 51a extends is the same as the direction in which the first penetration part 51a extends. That is, the second penetration part 42 in the embodiment is an elongated hole extending in the longitudinal direction Y.

As shown in FIGS. 3 and 4, in the embodiment, the first penetration part 51a and the second penetration part 42, when viewed in the axial direction, have shapes same as each other and sizes substantially same as each other. When viewed in the axial direction, the first penetration part 51a and the second penetration part 42 are substantially entirely overlapped with each other. The coil lead wire 34 passes through the first penetration part 51a and the second penetration part 42 in the axial direction. In the embodiment, two coil lead wires 34 pass through one first penetration part 51a and one second penetration part 42 in the axial direction. As shown in FIG. 3, the coil lead wire 34 passing through the first penetration part 51a and the second penetration part 42 protrude upward with respect to the upper surface of the substrate 40.

The holding part 50a is connected with the connection part 51. The holding part 50a is a portion that holds the coil lead wire 34 passing through the first penetration part 51a. The holding part 50a protrudes downward from the connection part 51. As shown in FIG. 5, the holding part 51a has a pair of holding arm parts 52, 53. The holding arm part 52 is connected with an edge of the connection part 51 on the side (+X side) in the transverse direction. The holding arm part 53 is connected with an edge of the connection part 51 on the other side (-X side) in the transverse direction. The holding arm part 52 and the holding arm part 53 are disposed to be symmetric to each other in the transverse direction X.

The holding arm part 52 has a protrusion part 52a protruding downward from the connection part 51 and an elastic support piece 52b connected with the end part on the lower side of the protrusion part 52a. The holding arm part 53 has a protrusion part 53a protruding downward from the connection part 51 and an elastic support piece 53b connected with the end part on the lower side of the protrusion part 53a. That is, the holding part 50a has the pair of protrusion parts 52a, 53a protruding downward from the connection part 51 and the pair of elastic support pieces 52b, 53b respectively connected with the end parts on the lower side of the pair of protrusion parts 52a, 53a.

The protrusion part 52a protrudes downward from the edge of the connection part 51 on the side (+X side) in the transverse direction. The protrusion part 53a protrudes downward from the edge of the connection part 51 on the other side (-X side) in the transverse direction. In the embodiment, the protrusion parts 52a, 53a are in plate-shapes in which the plate surfaces are directed in the transverse direction X. The protrusion parts 52a, 53a are substantially rectangular plate-shaped and elongated in the longitudinal direction Y. The protrusion part 52a and the protrusion part 53a are disposed to face each other at an interval in the transverse direction X. The dimensions of the protrusion parts 52a, 53a in the longitudinal direction Y are smaller than the dimension of the connection part 51 in the longitudinal direction Y. The protrusion parts 52a, 53a are disposed to be spaced apart in the longitudinal direction Y from the end parts 51b, 51c of the connection part 51 in the longitudinal direction Y. In other words, the connection part 51 protrudes toward the two sides in the longitudinal direction Y with respect to the protrusion parts 52a, 53a. The dimensions of the protrusion parts 52a, 53a in the longitudinal direction Y is smaller than the dimension of the first penetration part 51a in the longitudinal direction Y in the connection part 57. The first penetration part 51a in the embodiment protrudes toward the two sides in the longitudinal direction Y with respect to the protrusion parts 52a, 53a.

The pair of elastic support pieces 52b, 53b are elastically deformable in the axial direction by using the respective end parts on the lower side of the pair of protrusion parts 52a, 53a as fulcrums. The elastic support piece 52b protrudes toward the other side (-X side) in the transverse direction from the end part on the lower side of the protrusion part 52a. The elastic support piece 52b is positioned upward toward the other side in the transverse direction. The elastic support piece 53b protrudes toward the side (+X side) in the transverse direction from the end part on the lower side of the protrusion part 53a. The elastic support piece 53b is positioned upward toward the side in the transverse direction. The end part on the other side of the elastic support piece 52b in the transverse direction and the end part on the side of the elastic support piece 53b in the transverse direction are disposed to face each other by being spaced apart by a gap G in the transverse direction X. That is, the pair of elastic support pieces 52b, 53b are disposed to face each other in the transverse direction X as the first direction intersecting with the axial direction.

In the embodiment, the pair of elastic support pieces 52b, 53b extend in the longitudinal direction Y. The pair of elastic support pieces 52b, 53b are substantially rectangular plate-shaped and elongated in the longitudinal direction Y. The plate surfaces of the pair of elastic support pieces 52b, 53b are directed in a direction obliquely inclined in the transverse direction X with respect to the axial direction. The dimension of the elastic support piece 52*b* in the longitudinal direction Y and the position of the elastic support piece 52*b* in the longitudinal direction Y are respectively the same as the dimension of the protrusion part 52*a* in the longitudinal direction Y and the position of the protrusion part 52*a* in the longitudinal direction Y. The dimension of the elastic support piece 53*b* in the longitudinal direction Y and the position of the elastic support piece 53*b* in the longitudinal direction Y are respectively the same as the dimension of the protrusion part 53*a* in the longitudinal direction Y and the position of the protrusion part 53*a* in the longitudinal direction Y.

As shown in FIG. 4, the end part on the other side (−X side) of the elastic support piece 52*b* in the transverse direction and the end part on the side (+X side) of the elastic support piece 53*b* in the transverse direction sandwich the two coil lead wires 34 in the transverse direction X. The end part on the other side of the elastic support piece 52*b* in the transverse direction and the end part on the side of the elastic support piece 53*b* in the transverse direction contact the outer peripheral surfaces of the two coil lead wires 34. In the embodiment, the pair of elastic support pieces 52*b*, 53*b* contact the outer peripheral surfaces of the two coil lead wires 34 in the state of being elastically deformed toward the upper side by using, as fulcrums, the lower end parts of the protrusion parts 52*a*, 53*a* connected with the respective elastic support pieces 52*b*, 53*b*. Each of the elastic support pieces 52*b*, 53*b* presses the coil lead wires 34 against the other elastic support piece by using the restoring force generated in each of the elastic support pieces 52*b*, 53*b*.

Accordingly, each of the pair of elastic support pieces 52*b*, 53*b* contacts the outer peripheral surfaces of the coil lead wires 34, is positioned upward toward the coil lead wires 34, and, in the state of being elastically deformed, presses the coil lead wires 34 against other portions in the conductive member 50. Accordingly, the coil lead wires 34 passing through the first penetration part 51*a* and the second penetration part 42 are supported by the two elastic support pieces 52*b*, 53*b* on the lower side with respect to the first penetration part 51*a*. Therefore, the coil lead wires 34 are held at the conductive member 50 by using the holding part 50*a*.

In the embodiment, the holding part 50*a* holds the two coil lead wires 34 by using the two elastic support pieces 52*b*, 53*b*. The two coil lead wires 34 held by the support part 50*a* are disposed to be space apart at an interval in the longitudinal direction Y. That is, between the pair of elastic support pieces 52*b*, 53*b* in the transverse direction X, the two coil lead wires 34 are held at an interval in the longitudinal direction Y. The two coil lead wires 34 held by the pair of elastic support pieces 52*b*, 53*b* both pass through the first penetration part 51*a* in the axial direction. In the embodiment, the respective coils 33 drawn out by the two coil lead wires 34 held by one conductive member 50 are coils 33 through which currents of the same phase flow.

As shown in FIG. 4, when viewed in the axial direction, the entire gap G between the pair of elastic support pieces 52*b*, 53*b* is overlapped with the first penetration part 51*a* and the second penetration part 42. When viewed in the axial direction, the entire gap G is disposed to be away from the inner edge of the first penetration part 51*a* and the inner edge of the second penetration part 42. When viewed in the axial direction, the gap G extends in the longitudinal direction Y.

Figure 6:
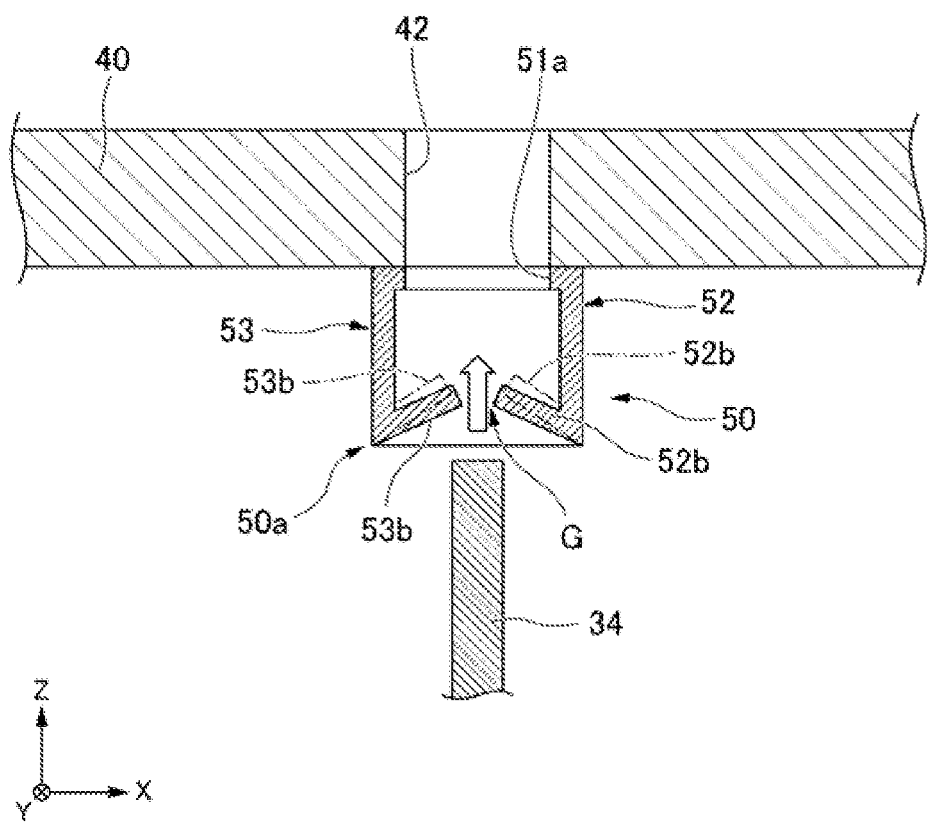
FIG. 6 is a cross-sectional view illustrating a portion of a procedure of a process of connecting a coil lead wire to a substrate according to the first embodiment.

In the following, a procedure of a process of connecting the coil lead wire 34 to the substrate 40 via the conductive member 50 is described. As shown in FIG. 6, an operator, etc., brings from the lower side the coil lead wire 34 drawn upward from the coil 33 toward the gap G between the pair of elastic support pieces 52*b*, 53*b* provided at the conductive member 50. Specifically, the operator, etc., brings from the lower side the coil lead wire 34 toward the gap G by, for example, bringing the substrate 40 in which the conductive member 50 is fixed to the lower surface toward the stator 30 fixed to the housing 10.

Here, as indicated by the solid line shown in FIG. 6, in the state before the coil lead wire 34 is held at the conductive member 50, the dimension of the gap G between the pair of elastic support pieces 52*b*, 53*b* in the transverse direction X is smaller than the outer diameter of the coil lead wire 34. When the substrate 40 is brought toward the stator 40 from the upper side to insert the coil lead wire 34 into the gap G from the lower side in such state, as indicated by a two-dot chain line in FIG. 6, the pair of elastic support pieces 52*b*, 53*b* are pressed upward by the coil lead wire 34 to be elastically deformed, and the gap G becomes widened in the transverse direction X. Accordingly, the coil lead wire 45 can pass between the pair of elastic support pieces 52*b*, 53*b* in the axial direction, and the coil lead wire 34 can be electrically connected with the conductive member 50 by being sandwiched using the pair of elastically support pieces 52*b*, 53*b*. In the embodiment, the coil lead wire 34 is electrically connected with the land part 43 of the substrate 40 via the pair of elastic support pieces 52*b*, 53*b* and the connection part 51.

By bringing the substrate 40 further toward the stator 30, the operator, etc., further presses the coil lead wire 34 with respect to the holding part 51*a* of the conductive member 50, and, as shown in FIG. 2, passes the coil lead wire 34 through the first penetration part 51*a* and the second penetration part 42. After passing the coil lead wire 34 through the first penetration part 51*a* and the second penetration part 42 and making the coil lead wire 34 protrude upward with respect to the substrate 40, the operator, etc., cuts off a redundant portion 34*a*, as indicated by two-dot chain lines in FIG. 3, from the coil lead wire 34.

"Operator, etc." in the specification covers the operator as well as an assembling device, etc., performing the respective processes. The respective processes may be performed by the operator only, by the assembling device only, or by the operator and the assembling device.

According to the embodiment, the rotary electric machine 100 includes the conductive member 50 attached to the lower side surface of the substrate 40. The conductive member 50 is provided with the connection part 51 electrically connected with the substrate 40 and the holding part 50*a* having the elastic support pieces 52*b*, 53*b* and connected with the connection part 51. The coil lead wire 34 passes through the first penetration part 51*a* of the connection part 51 and the second penetration part 42 of the substrate 40. The coil lead wire 34 passing through the first penetration part 51*a* and the second penetration part 42 is supported by the two elastic support pieces 52*b*, 53*b* on the lower side with respect to the first penetration part 51*a*. Each of the two elastic support pieces 52*b*, 53*b* contacts the outer peripheral surface of the coil lead wire 34, is positioned upward toward the coil lead wire 34, and presses the coil lead wire 34 against other portions in the conductive member 50 in the state of being elastically deformed. Therefore, as described above, by bringing from the lower side the coil lead wire 34 toward the two elastic support pieces 52*b*, 53*b*, the coil lead wire 34 can be easily and firmly electrically connected with the conductive wire 50 by using the two elastic support pieces 52*b*, 53*b*. Accordingly, the coil lead wire 34 can be easily electrically connected with the substrate 40 via the conductive member 50 without soldering the coil lead wire 34 with respect to the substrate 40. Therefore, according to the embodiment, the man-hours and the time required for the process of electrically connecting the coil lead wire 34 to the substrate 40 can be reduced.

In addition, since the elastic support pieces 52*b*, 53*b* are positioned upward toward the coil lead wire 34, when the coil lead wire 34 is brought toward the elastic support pieces 52*b*, 53*b* from the lower side and the coil lead wire 34 is held by the holding part 50*a*, the elastic support pieces 52*b*, 53*b* are pushed upward by the coil lead wire 34 and can be easily elastically deformed. Accordingly, the coil lead wire 34 can be easily held by the holding part 50*a*. Therefore, the man-hours and the time required for the process of electrically connecting the coil lead wire 34 to the substrate 40 can be further reduced.

In addition, since the second penetration part 42 through which the coil lead wire 34 passes is provided at the substrate 40, at the time of performing the process of holding the coil lead wire 34 at the conductive member 50, it is not necessary to adjust the length of the coil lead wire 34 in advance. That is, even if the coil lead wire 34 is longer than the necessary length for the rotary electric machine 100, the redundant portion 34*a* of the coil lead wire 34 may be cut off and removed after the coil lead wire 34 passes through the second penetration part 42 as described above. Therefore, it is not necessary to perform the process of adjusting the length of the coil lead wire in advance in accordance with the position in the axial direction at which the substrate 40 is disposed with respect to the stator 30, and the man-hours and the time required for the process of electrically connecting the coil lead wire 34 to the substrate 40 can be further reduced.

In addition, according to the embodiment, the holding part 50*a* holds the two coil lead wires 34 by using multiple elastic support pieces 52*b*, 53*b*. Therefore, the quantity of the conductive members 50 can be fewer than the quantity of the coil lead wires 34, and the increase in the number of parts of the rotary electric machine 100 can be suppressed. For example, in the case where multiple coil lead wires 34 are held by the pair of elastic support pieces 52*b*, 53*b* as in the embodiment, when the coil lead wires 34 are inserted between the pair of elastic support pieces 52*b*, 53*b*, the coil lead wires 34 apply a force to the pair of elastic support pieces 52*b*, 53*b*, and the pair of elastic support pieces 52*b*, 53*b* can thus be elastically deformed. Therefore, the pair of elastic support pieces 52*b*, 53*b* are easily elastically deformed. Accordingly, the process of passing the coil lead wires 34 through the first penetration part 51*a* and the second penetration part 42 while holding the coil lead wires 34 at the holding part 50*a* can be easily performed. Therefore, the man-hours and the time required for the process of electrically connecting the coil lead wire 34 to the substrate 40 can be more appropriately reduced.

In addition, according to the embodiment, the holding part 50*a* is provided with the pair of protrusion parts 52*a*, 53*a* protruding downward from the connection part 51. The elastic support pieces include the pair of elastic support pieces 52*b*, 53*b* respectively connected with the end parts on the lower side of the pair of protrusion parts 52*a*, 53*a*. The pair of elastic support pieces 52*b*, 53*b* are disposed to face each other in the transverse direction X intersecting with the axial direction and extend in the longitudinal direction Y intersecting with the axial direction and orthogonal to the transverse direction X. Between the pair of elastic support pieces 52*b*, 53*b* in the transverse direction X, the two coil lead wires 34 are held at an interval in the longitudinal direction Y. Therefore, the two coil lead wires 34 can be properly sandwiched and held between the pair of elastic support pieces 52*b*, 53*b*. Compared with the case where the pair of elastic support pieces 52*b*, 53*b* are provided for each coil lead wire 34, the shape of the conductive member 50 can be suppressed from being complicated.

In addition, according to the embodiment, the first penetration part 51*a* is an elongated hole extending in the longitudinal direction Y. The two coil lead wires 34 held by the pair of elastic support pieces 52*b*, 53*b* pass through the first penetration part 51*a*. Therefore, even if the positions, in the longitudinal direction Y, of the two coil lead wires 34 passing between the pair of elastic support pieces 52*b*, 53*b* from the lower side are slightly deviated, the two coil lead wires 34 easily pass through the first penetration part 51*a* that is an elongated hole. Accordingly, compared with the case where the holes through which the two coil lead wires 34 pass are provided separately in the connection part 51, the two coil lead wires 34 can easily pass through the first penetration part 51*a*. Therefore, the man-hours and the time required for the process of electrically connecting the coil lead wire 34 to the substrate 40 can be further reduced.

In addition, according to the embodiment, the entire gap G between the pair of elastic support pieces 52*b*, 53*b* is overlapped with the first penetration part 51*a* when viewed in the axial direction. Therefore, regardless of the position in the gap G between the pair of elastic support pieces 52*b*, 53*b* at which the coil lead wire 34 passes through in the axial direction, the coil lead wires 34 can pass through the first penetration part 51*a* after passing through the gap G between the pair of elastic support pieces 52*b*, 53*b*. Accordingly, the coil lead wires 34 do not need to be positioned with respect to the first penetration part 51*a* in the longitudinal direction Y, as long as the positions of the coil lead wires 34 in the longitudinal direction Y are aligned with the gap G between the pair of elastic support pieces 52*b*, 53*b*. Therefore, the man-hours and the time required for the process of electrically connecting the coil lead wire 34 to the substrate 40 can be further reduced.

In addition, according to the embodiment, the second penetration part 42 is an elongated hole extending in the longitudinal direction Y. The entire gap G between the pair of elastic support pieces 52*b*, 53*b* is overlapped with the second penetration part 42 when viewed in the axial direction. Therefore, regardless of the position in the gap G between the pair of elastic support pieces 52*b*, 53*b* at which the coil lead wire 34 passes through in the axial direction, the coil lead wires 34 can pass through the first penetration part 51*a* as well as the second penetration part 42 after passing through the gap G between the pair of elastic support pieces 52*b*, 53*b*. Accordingly, The coil lead wires 34 do not need to be positioned with respect to the first penetration part 51*a* and the second penetration part 42 in the longitudinal direction Y, as long as the positions of the coil lead wires 34 in the longitudinal direction Y are aligned with the gap G between the pair of elastic support pieces 52*b*, 53*b*. Therefore, the man-hours and the time required for the process of electrically connecting the coil lead wire 34 to the substrate 40 can be further reduced.

In addition, according to the embodiment, multiple conductive members 50 are provided. Therefore, four or more coil lead wires 34 can be easily connected with the substrate via the conductive members 50.

It is noted that, in the embodiment, the first penetration part 51*a* and the second penetration part 42 have the same quantities as the quantity of the coil lead wire 34. In such case, for example, in the connection part 51, two first penetration parts 51a are provided at an interval in the longitudinal direction Y, and in the substrate 40, the second penetration parts 42 are respectively provided at positions overlapped with the two first penetration parts 51a in the axial direction.

In the following, embodiments different from the first embodiment are described. In the description of each embodiment below, the same reference numerals may be given to the same configurations as in the first embodiment described above, and the description thereof may be omitted. Moreover, as the configuration omitted from the description in each embodiment below, the configuration similar to that of the above-described first embodiment can be adopted, as long as no inconsistency is caused.

Figure 7:
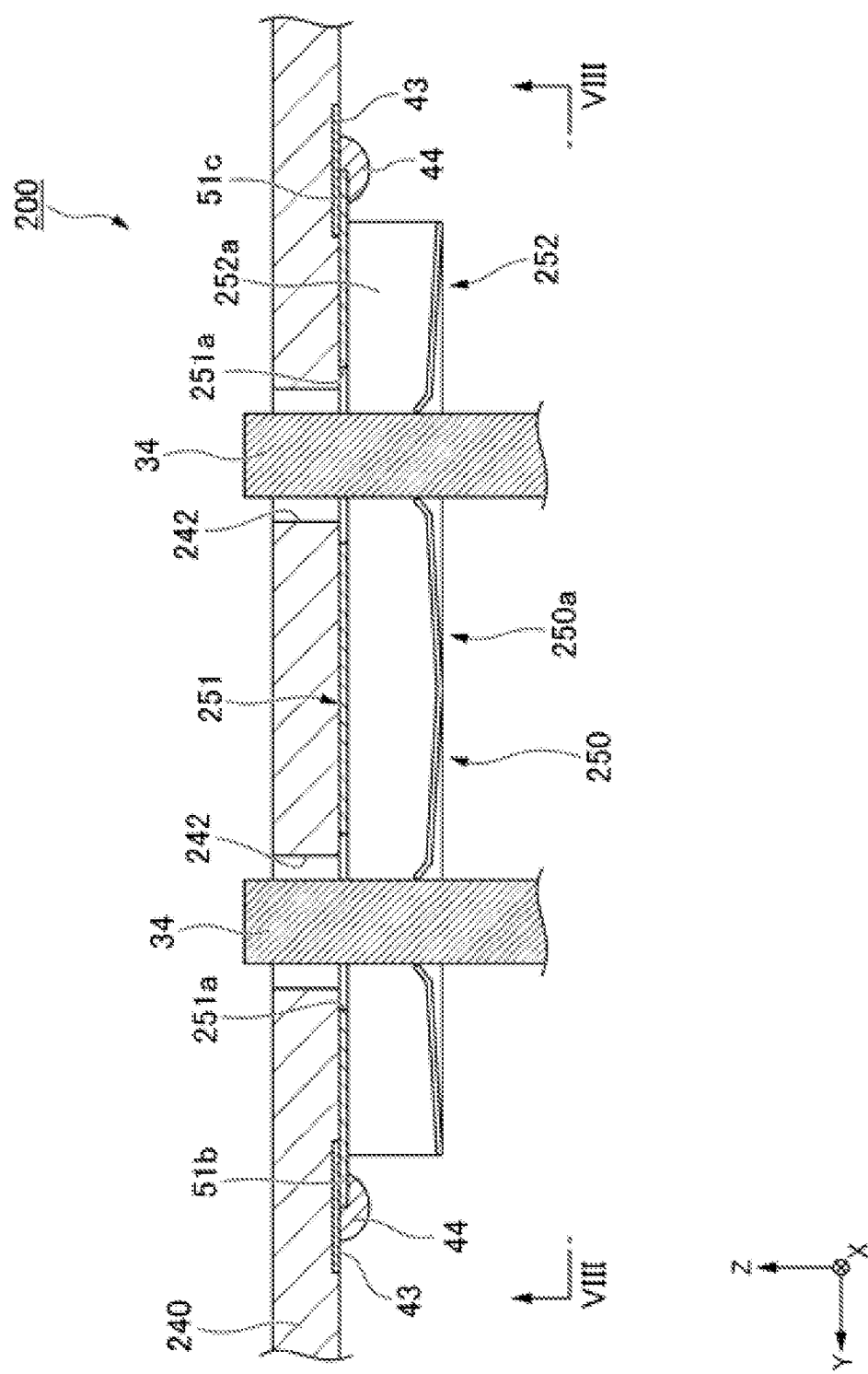
FIG. 7 is a cross-sectional view illustrating a portion of a rotary electric machine according to a second embodiment.
Figure 8:
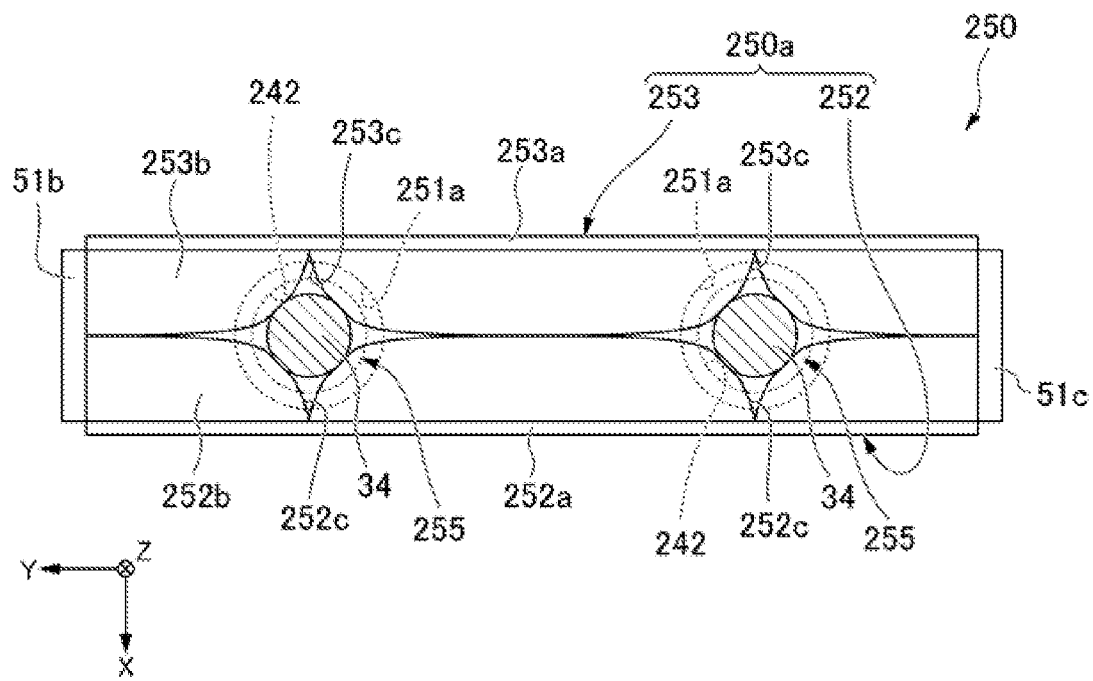
FIG. 8 is a cross-sectional view illustrating a portion of the rotary electric machine according to the second embodiment, and is a cross-sectional view taken along VIII-VIII in FIG. 7.

As shown in FIGS. 7 and 8, a substrate 240 in a rotary electric machine 200 of the embodiment has multiple second penetration parts 242 for one conductive member 250. In the embodiment, two second penetration parts 242 are provided for one conductive member 250. The two second penetration parts 242 are disposed at an interval in the longitudinal direction Y. The second penetration part 242 is a circular hole.

In the embodiment, a connection part 251 of the conductive member 250 has multiple first penetration parts 251a. In the embodiment, two first penetration parts 251a are provided in the connection part 251. The two first penetration parts 251a are disposed at an interval in the longitudinal direction Y. As shown in FIG. 8, the two first penetration parts 251a, when viewed in the axial direction, are respectively overlapped with the two second penetration parts 242. When viewed in the axial direction, the first penetration part 251a that is circular and the second penetration part 242 that is circular are coaxially disposed. The inner diameter of the first penetration part 251a is greater than the inner diameter of the second penetration part 242. When viewed in the axial direction, the inner edge of the first penetration part 251a surrounds the second penetration part 242.

A holding part 250a of the conductive member 250 is provided with a pair of holding arm parts 252, 253. The holding arm part 252 has a first protrusion part 252a protruding downward from the connection part 251 and a second protrusion part 252b connected with the end part on the lower side of the first protrusion part 252a. The holding arm part 253 has a first protrusion part 253a protruding downward from the connection part 251 and a second protrusion part 253b connected with the end part on the lower side of the first protrusion part 253a. That is, the holding part 250a has the pair of first protrusion parts 252a, 253a protruding downward from the connection part 251 and the pair of second protrusion parts 252b, 253b respectively connected with the end parts on the lower side of the pair of first protrusion parts 252a, 253a. The pair of first protrusion parts 252a, 253a respectively have the same configurations as the pair of protrusion parts 52a, 53a in the first embodiment.

In the transverse direction X intersecting with the axial direction, each of the pair of second protrusion parts 252b, 253b protrudes toward the other second protrusion part with respect to each other. The second protrusion part 252b protrudes toward the other side (−X side) in the transverse direction from the end part on the lower side of the first protrusion part 252a. The second protrusion part 253b protrudes toward the side (+X side) in the transverse direction from the end part on the lower side of the first protrusion part 253a. In the embodiment, the pair of second protrusion parts 252b, 253b are in a substantially rectangular shape elongated in the longitudinal direction Y. The plate surfaces of the pair of second protrusion parts 252b, 253b are directed in the axial direction.

Slits 252c, 253c extending in the transverse direction X are respectively provided at the pair of second protrusion parts 252b, 253b. Two slits 252c are provided at the second protrusion part 252b at an interval in the longitudinal direction Y. Two slits 253c are provided at the second protrusion part 253b at an interval in the longitudinal direction Y. The two slits 252c and the two slits 253c are respectively disposed to face each other in the transverse direction X. Each of the slits 252c, 253c is in a state of expanding in the longitudinal direction Y.

The slit 252c extends from the end part on the side (+X side) of the second protrusion part 252b in the transverse direction until the end part on the other side (−X side) in the transverse direction to open on the other side in the transverse direction. In the longitudinal direction Y, the slit 252c splits the tip end part of the second protrusion part 252b in the protrusion direction. The tip end part of the second protrusion part 252b in the protrusion direction is the end part on the other side of the second protrusion part 252b in the transverse direction.

The slit 253c extends from the end part on the other side (−X side) of the second protrusion part 253b in the transverse direction until the end part on the side (+X side) in the transverse direction to open on the side in the transverse direction. In the longitudinal direction Y, the slit 253c splits the tip end part of the second protrusion part 253b in the protrusion direction. The tip end part of the second protrusion part 253b in the protrusion direction is the end part on the side of the second protrusion part 253b in the transverse direction.

The tip end parts of the second protrusion parts 252b, 253b in the protrusion direction are disposed to face each other in the transverse direction, and are partially in contact with each other. More specifically, except for the portions where the slits 252c, 253c are provided and the peripheral parts of the portions where the slits 252c and 253c are provided, the tip end parts of the second protrusion parts 252b, 253b in the protrusion direction are in contact with each other in the transverse direction X. The tip end parts of the second protrusion parts 252b, 253b in the protrusion direction may also be disposed to face each other via a gap.

Figure 9:
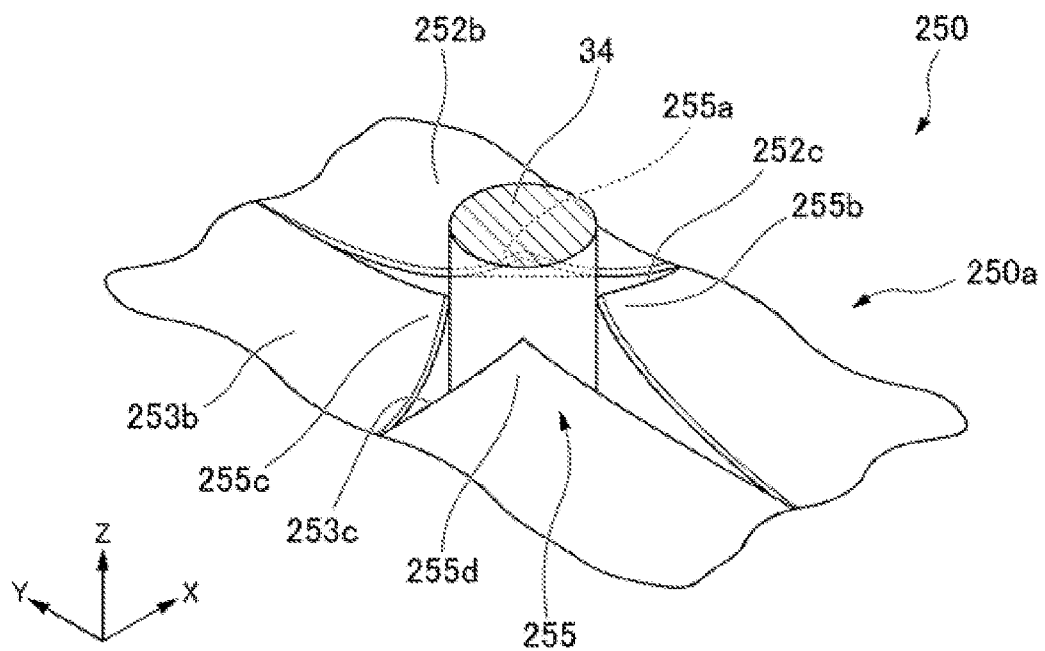
FIG. 9 is a perspective view illustrating an elastic support piece group and a coil lead wire according to the second embodiment.

As shown in FIG. 9, the elastic support pieces for the holding part 250a of the conductive member 250 include an elastic support piece group 255 including three or more elastic support pieces surrounding the coil lead wire 34. The elastic support piece group 255 in the embodiment includes four elastic support pieces 255a, 255b, 255c, 255d. The pair of elastic support pieces 255a, 255b are respectively formed by two portions split in the longitudinal direction Y by the slit 252c in the tip end part of the second protrusion part 252b in the protrusion direction. The pair of elastic support pieces 255c, 255d are respectively formed by two portions split in the longitudinal direction Y by the slit 253c in the tip end part of the second protrusion part 253b in the protrusion direction. That is, the four elastic support pieces 255a, 255b, 255c, 255d in the embodiment are respectively formed by two portions split in the longitudinal direction Y by the slit 252c in the second protrusion part 252b and two portions split in the longitudinal direction Y by the split 253c in the other second protrusion part 253b. The elastic support pieces 255a, 255b, 255c, 255d surround one coil lead wire 34.

The elastic support pieces 255a, 255b, 255c, 255d included in the elastic support piece group 255 are respectively in contact with the outer peripheral surface of the coil lead wire 34. The elastic support pieces 255a, 255b, 255c, 255d included in the elastic support piece group 255 are respectively positioned upward toward the coil lead wire 34. In the state of being elastically deformed, the elastic support pieces 255a, 255b, 255c, 255d included in the elastic support piece group 255 press the coil lead wire 34 against other elastic support pieces. Accordingly, the coil lead wire 34 is supported by the elastic support piece group 255 on the lower side with respect to the first penetration part 251a.

Figure 10:
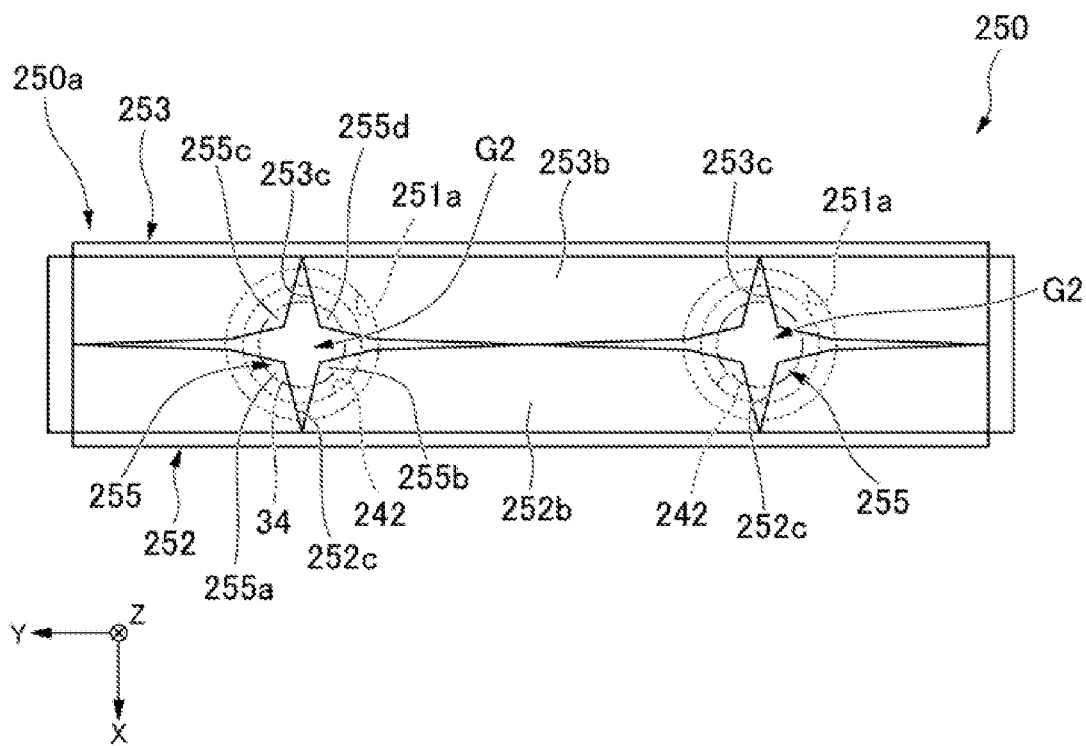
FIG. 10 is a view illustrating a conductive member according to the second embodiment when viewed from a lower side, and is a view illustrating the conductive member in a state before the coil lead wire is held.

As shown in FIGS. 8 and 10, in the embodiment, two elastic support piece groups 255 are provided at an interval in the longitudinal direction Y. When viewed in the axial direction, each elastic support piece group 255 is provided at a position overlapped with each first penetration part 251a and each second penetration part 242. Each elastic support piece group 255 respectively holds one coil lead wire 34.

The elastic support piece group 255 in the embodiment is manufactured by providing the respective slits 252c, 253c at the second protrusion parts 252b, 253b, then pushing a rod-shaped member from the lower side to a portion where the slits 252c, 253c face each other in the transverse direction X, and plastically deforming, toward the upper side, the respective portions arranged to sandwich the slits 252c, 253c in the second protrusion parts 252b, 253b.

As shown in FIG. 10, in the state before the lead wire 34 passes through, a gap G2 surrounded by the four elastic support pieces 255a, 255b, 255c, 255d in the elastic support piece group 255 is smaller than the coil lead wire 34. By inserting the coil lead wire 34 into the gap G2 from the lower side, the elastic support pieces 255a, 255b, 255c, 255d are elastically deformed upward, and the gap G2 is pushed to expand. In the embodiment, by inserting the coil lead wire 34 among the four elastic support pieces 255a, 255b, 255c, 255d from the lower side, the coil lead wire 34 can be electrically connected with the conductive member 250 easily.

According to the embodiment, the elastic support pieces for the conductive member 250 have the elastic support piece group 255 including three or more elastic support pieces 255a to 255d surrounding the coil lead wire 34. Therefore, by using the three or more elastic support pieces 255a to 255d, the coil lead wire 34 can be positioned in a plane orthogonal to the axial direction. Specifically, in the embodiment, with the elastic support piece group 255, the coil lead wire 34 can be positioned in the transverse direction X and the longitudinal direction Y. Accordingly, the coil lead wire 34 can be stably held with respect to the holding part 250a. Since the coil lead wire 34 can be positioned in the plane orthogonal to the axial direction, by arranging the first penetration part 251a and the second penetration part 242 at a position overlapped with the elastic support piece group 255 in the axial direction, the coil lead wire 34 passing through the three or more elastic support pieces 255a to 255d can appropriately pass through the first penetration part 251a and the second penetration part 242. Accordingly, the size of the first penetration part 251a and the size of the second penetration part 242 can be reduced within a range in which the coil lead wire 34 can pass through. Therefore, the rigidity of the connection part 251 and the rigidity of the substrate 240 can be suppressed from decreasing. In addition, since the second penetration part 242 provided at the substrate 240 can be reduced, the region where a conductive patter is provided and a region in which an electronic component is mounted on the substrate 240 can be suppressed from decreasing.

In the embodiment, since the elastic support pieces includes two or more elastic support piece groups 255 in one conductive member 250, by using one conductive member 250, multiple coil lead wires 34 can be stably held. Accordingly, the quantity of the conductive members 250 can be suppressed from increasing, and the number of parts of the rotary electric machine 200 can be suppressed from increasing.

In addition, according to the embodiment, the elastic support piece group 255 includes four elastic support pieces 255a to 255d. The four elastic support pieces 255a to 255d in the embodiment are respectively formed by two portions split in the longitudinal direction Y by the slit 252c in the second protrusion part 252b and two portions split in the longitudinal direction Y by the split 253c in the other second protrusion part 253b. Therefore, by using the four elastic support pieces 255a to 255d, the coil lead wire 34 can be held stably. In addition, with a simple configuration in which the slits 252c, 253c are provided at the pair of second protrusion parts 252b, 253b, the elastic support piece group 255 can be formed.

Figure 11:
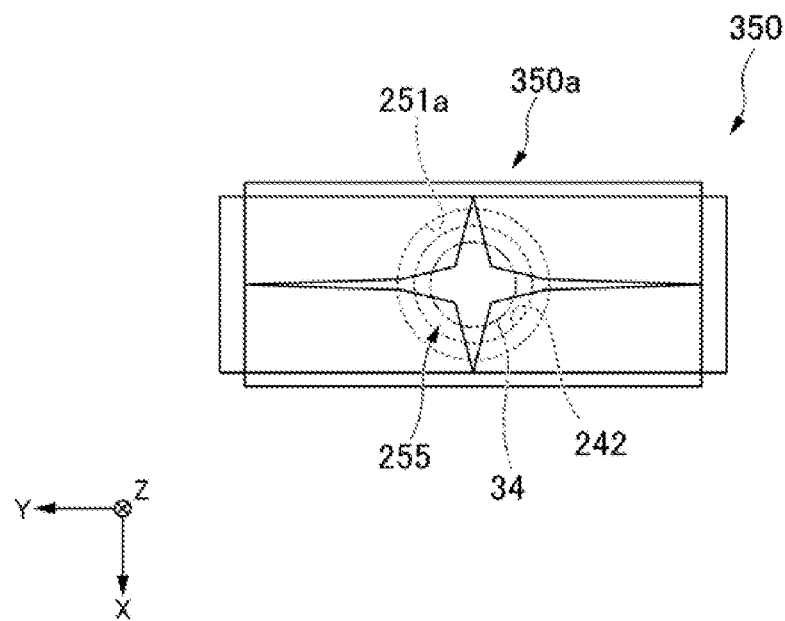
FIG. 11 is a view illustrating the conductive member according to a modified example of the second embodiment when viewed from a lower side.

In the embodiment, two elastic support piece groups 255 are provided in the holding part 250a of one conductive member 250. However, the invention is not limited thereto. According to a holding part 350a of a conductive member 350 shown in FIG. 11, it may also be that only one elastic support piece group 255 is provided at the holding part 350a of one conductive member 350. In addition, while not shown in the drawings, it may also be that three or more elastic support piece groups are provided in the holding part of one conductive member.

Figure 12:
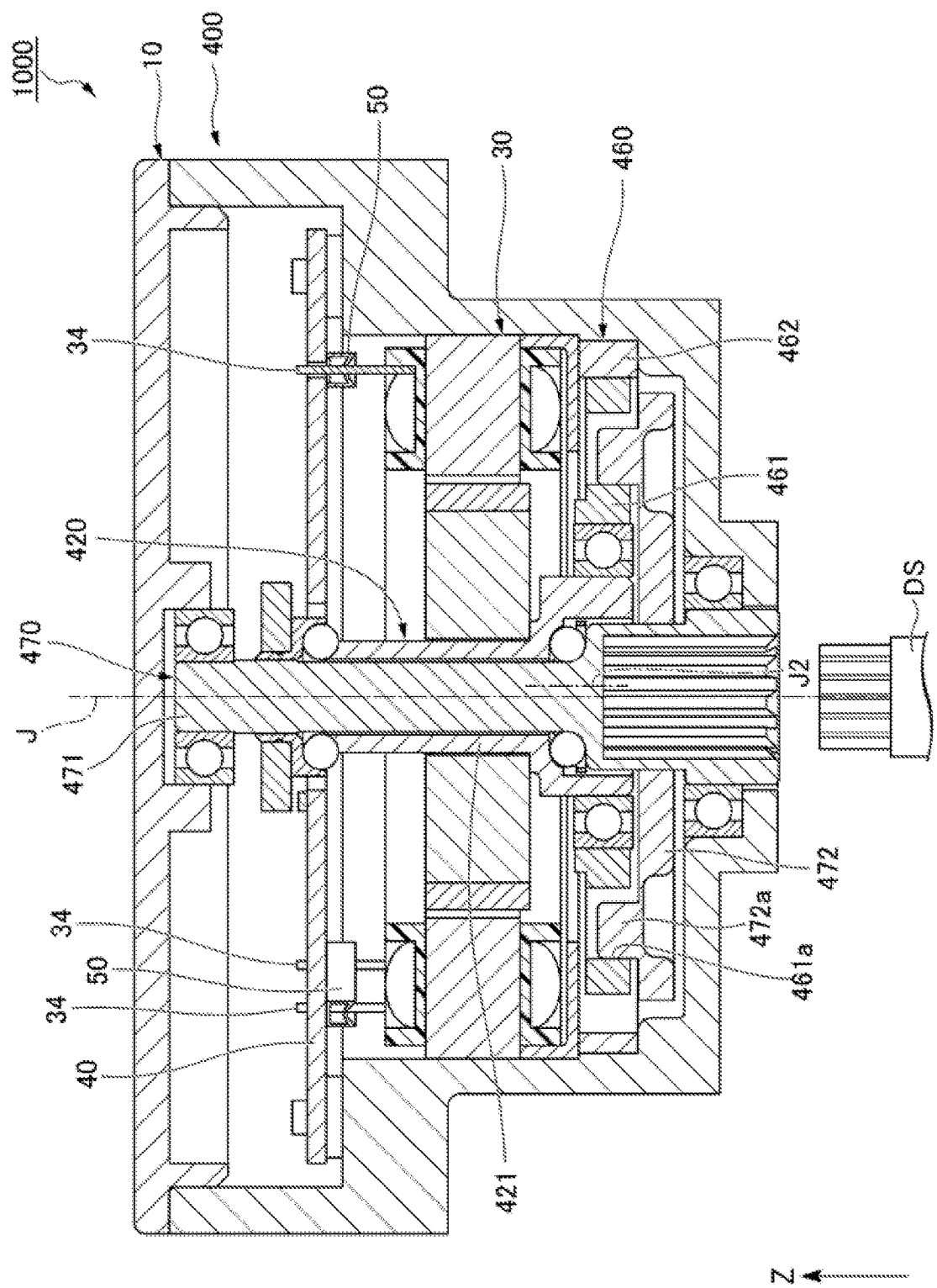
FIG. 12 is a cross-sectional view illustrating an embodiment of an electric actuator.

As shown in FIG. 12, the rotary electric motor according to the embodiments of the invention may also be applied to an electric actuator including a transmission mechanism. An electric actuator 1000 shown in FIG. 12 includes a rotary electric machine 400, a transmission mechanism 460 linked with a rotor 420 of the rotary electric machine 400, and an output part 470.

A shaft 421 in the rotor 420 of the rotary electric machine 400 is a hollow shaft open on two sides in the axial direction. The transmission mechanism 460 is linked to the end part on the lower side of the shaft 421. The rotary electric machine 400, like the rotary electric machine 100 of the first embodiment, includes the conductive member 50.

The transmission mechanism 460 of the embodiment is a decelerator. The transmission mechanism 460 is fixed in the housing 10. The transmission mechanism 460 has an external gear 461 linked with the shaft 421 via a bearing and an internal gear 462 having a ring shape and surrounding the external gear 461. The external gear 461 is linked with a portion with an eccentric axis J2 as the center in the shaft 421 via a bearing. The eccentric axis J2 is a virtual axis eccentric with respect to the central axis J in the radial direction. The central axis J and the eccentric axis J2 are parallel to each other. The internal gear 462 meshes with the external gear 461. The internal gear 462 is fixed in the housing 10.

The output part 470 is provided with an output shaft 471 extending in the axial direction and an output flange part 472 fixed to a lower portion of the output shaft 471. At least a portion of the output shaft 471 is located inside the shaft 421. In the embodiment, the output shaft 471 passes through the inside of the shaft 421 in the axial direction and protrudes toward the two sides in the axial direction with respect to the shaft 421. The end part on the lower side of the output shaft is exposed to the outside of the housing 10. A driven shaft DS is linkable with the end part on the lower side of the output shaft 471.

The output flange part 471 expands from the output shaft 471 toward the radially outer side. The output flange part 472 has a protrusion part 472a protruding upward. Multiple protrusion parts 472a are provided at intervals in the circumferential direction. The protrusion parts 472a are respectively inserted from the lower side into multiple hole parts 461a provided at the external gear 461. The outer peripheral surface of the protrusion part 472a is inscribed with the inner peripheral surface of the hole part 461a. Accordingly, the protrusion parts 472a support the external gear 461 via the inner side surfaces of the hole parts 461a to be swingable about the central axis J.

When the rotary electric machine 400 is supplied with power and the shaft 421 rotates about the central axis J, the external gear 461 linked with the shaft 421 via the bearing swings, while the positions where the inner peripheral surfaces of the hole parts 461 are inscribed with the outer peripheral surfaces of the protrusion parts 472a change. Accordingly, the position where the gear part of the external gear 461 and the gear part of the internal gear 462 are meshed with each other changes in the circumferential direction. Therefore, the rotation force of the shaft 421 is transmitted to the internal gear 462 via the external gear 461. Here, in the embodiment, the internal gear 462 is fixed to the housing 10 and therefore does not rotate. Therefore, due to a reaction force of the rotation force transmitted to the internal gear 462, the external gear 461 rotates about the eccentric axis J2. The orientation in which the external gear 461 rotates at this time is opposite to the orientation in which the shaft 421 rotates. The rotation of the external gear 461 about the eccentric axis J2 is transmitted to the output flange part 472 via the hole parts 461a and the protrusion parts 472a. Accordingly, the output flange part 472 and the output shaft 471 rotate about the central axis J. In this way, the rotation of the shaft 421 is decelerated and transmitted to the output shaft 471 via the transmission mechanism 460.

It may also be that the protrusion parts 472a are provided at the external gear 461, and the hole parts 461a are provided at the flange part 472. In such case, the protrusion parts 472a provided at the external gear 461 protrude downward and are inserted into the hole parts 461a provided at the output flange part 472.

The invention is not limited to the above-described embodiments, and other configurations and methods can be adopted within the scope of the technical concept of the invention. The conductive member may be configured as appropriate as long as the conductive member is provided with the connection part and the holding part. The quantity of the conductive member is not particularly limited as long as one or more conductive members are provided. The quantity of the coil lead wire held by the holding part in one conductive member is not particularly limited as long as one or more coil lead wires are provided. For example, in the holding part 50a of the conductive member 50 of the first embodiment, it may be that only one coil lead wire 34 is held, and it may also be that three or more coil lead wires 34 are held. It suffices as long as the elastic support piece group is formed by three or more elastic support pieces. For example, the elastic support piece group may be formed by three elastic support pieces, and may also be formed by five or more elastic support pieces.

The elastic support piece may press the coil lead wire against any part of the conductive member as long as the elastic support piece presses the coil lead wire against other portions of the conductive member in the state of being elastically deformed. For example, the elastic support piece may press the coil lead wire against the protrusion part protruding from the connection part toward the other side in the axial direction.

The rotary electric machine to which the invention is applied is not limited to a motor, and may be a generator. The purpose of the rotary electric machine is not particularly limited. The rotary electric machine may also be mounted to an apparatus other than an electric actuator, such as an electric pump. The rotary electric machine may also be mounted to an apparatus other than a vehicle.

The technology may be configured as follows. (1) A rotary electric machine includes: a rotor, rotatable about a central axis extending in an axial direction as a center; a stator, having a plurality of coils and facing the rotor via a gap; a substrate, positioned on a side of the stator in the axial direction; and a conductive member, attached to a surface of the substrate on an other side in the axial direction. The stator has a plurality of coil lead wires extending from the coils toward the side in the axial direction. The conductive member has: a connection part, electrically connected with the substrate; and a holding part, having a plurality of elastic support pieces and connected with the connection part. The connection part has a first penetration part penetrating through the connection part in the axial direction. The substrate has a second penetration part penetrating through the substrate in the axial direction and, when viewed in the axial direction, overlapped with the first penetration part. The coil lead wires pass through the first penetration part and the second penetration part. The coil lead wires passing through the first penetration part and the second penetration part are supported by at least two elastic support pieces on the other side in the axial direction with respect to the first penetration part. Each of the at least two elastic support pieces contacts outer peripheral surfaces of the coil lead wires, is positioned on the side in the axial direction toward the coil lead wires, and, in a state of being elastically deformed, presses the coil lead wires against other portions in the conductive member. The holding part holds two or more coil lead wires by using the elastic support pieces. (2) The rotary electric machine according to (1). In the rotary electric machine, the holding part has a pair of protrusion parts protruding from the connection part to the other side in the axial direction. The elastic support pieces include a pair of elastic support pieces respectively connected with end parts on the other side of the pair of protrusion parts in the axial direction. The pair of elastic support pieces are disposed to face in a first direction intersecting with the axial direction and extend in a second direction intersecting with the axial direction and orthogonal to the first direction. Between the pair of elastic support pieces in the first direction, two or more of the coil lead wires are held at an interval in the second direction. (3) The rotary electric machine according to (2). In the rotary electric machine, the first penetration part is an elongated hole extending in the second direction. The two or more coil lead wires held at the pair of elastic support pieces pass through the first penetration part. (4) The rotary electric machine according to (3). In the rotary electric machine, when viewed in the axial direction, an entirety of a gap between the pair of elastic support pieces is overlapped with the first penetration part. (5) The rotary electric machine according to (4). In the rotary electric machine, the first penetration part is an elongated hole extending in the second direction. When viewed in the axial direction, an entirety of a gap between the pair of elastic support pieces is overlapped with the first penetration part. (6) The rotary electric machine according to (1). In the rotary electric machine, the elastic support pieces include two or more elastic support piece groups. The elastic support piece group include three or more elastic support pieces surrounding one coil lead wire. (7) A rotary electric machine includes: a rotor, rotatable about a central axis extending in an axial direction as a center; a stator, having a plurality of coils and facing the rotor via a gap; a substrate, positioned on a side of the stator in the axial direction; and a conductive member, attached to a surface of the substrate on an other side in the axial direction. The stator has a coil lead wire extending from the coils toward the side in the axial direction. The conductive member includes: a connection part, electrically connected with the substrate; and a holding part, having a plurality of elastic support pieces and connected with the connection part. The connection part has a first penetration part penetrating through the connection part in the axial direction. The substrate has a second penetration part penetrating through the substrate in the axial direction and, when viewed in the axial direction, overlapped with the first penetration part. The coil lead wire passes through the first penetration part and the second penetration part. The elastic support pieces include an elastic support piece group, the elastic support piece group including three or more elastic support pieces surrounding the coil lead wire. The coil lead wire is supported by the elastic support piece group on the other side in the axial direction with respect to the first penetration part. Each of the elastic support pieces included in the elastic support piece group contacts an outer peripheral surface of the coil lead wire, is positioned on the side in the axial direction toward the coil lead wire, and, in a state of being elastically deformed, presses the coil lead wire against other elastic support pieces. (8) The rotary electric machine according to (6) or (7). The holding part has: a pair of first protrusion parts, protruding from the connection part to the other side in the axial direction; and a pair of second protrusion parts, respectively connected with end parts on the other side of the pair of first protrusion parts in the axial direction. Each of the pair of second protrusion parts protrudes toward the other second protrusion part with respect to each other in a first direction intersecting with the axial direction. A slit extending in the first direction is provided at each of the pair of second protrusion parts. The slit splits, in a second direction, a tip end part of the second protrusion part in a protrusion direction, the second direction intersecting with the axial direction and orthogonal to the first direction. The elastic support piece group includes four elastic support pieces. The four elastic support pieces are respectively formed by two portions split in the second direction by the slit in one of the second protrusion parts and two portions split in the second direction by the slit in an other of the second protrusion parts. (9) The rotary electric machine according to any one of (1) to (8). In the rotary electric machine, a plurality of conductive members are provided. (10) An electric actuator includes: the rotary electric machine according to any one of (1) to (9); and a transmission mechanism, linked with the rotor of the rotary electric machine.

Features of the above-described preferred embodiments and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:
1. A rotary electric machine, comprising:
a rotor, rotatable about a central axis extending in an axial direction as a center;
a stator, having a plurality of coils and facing the rotor via a gap;
a substrate, positioned on a side of the stator in the axial direction; and
a conductive member, attached to a surface of the substrate on an other side in the axial direction,
wherein the stator has a plurality of coil lead wires extending from the coils toward the side in the axial direction,
the conductive member has:
a connection part, electrically connected with the substrate; and
a holding part, having a plurality of elastic support pieces and connected with the connection part,
the connection part has a first penetration part penetrating through the connection part in the axial direction,
the substrate has a second penetration part penetrating through the substrate in the axial direction and, when viewed in the axial direction, overlapped with the first penetration part,
the coil lead wires pass through the first penetration part and the second penetration part,
the coil lead wires passing through the first penetration part and the second penetration part are supported by at least two elastic support pieces on the other side in the axial direction with respect to the first penetration part,
each of the at least two elastic support pieces contacts outer peripheral surfaces of the coil lead wires, is positioned on the side in the axial direction toward the coil lead wires, and, in a state of being elastically deformed, presses the coil lead wires against other portions in the conductive member, and
the holding part holds two or more coil lead wires by using the elastic support pieces.
2. The rotary electric machine as claimed in claim 1, wherein the holding part has a pair of protrusion parts protruding from the connection part to the other side in the axial direction,
the elastic support pieces comprise a pair of elastic support pieces respectively connected with end parts on the other side of the pair of protrusion parts in the axial direction,
the pair of elastic support pieces are disposed to face in a first direction intersecting with the axial direction and extend in a second direction intersecting with the axial direction and orthogonal to the first direction, and
between the pair of elastic support pieces in the first direction, two or more of the coil lead wires are held at an interval in the second direction.
3. The rotary electric machine as claimed in claim 2, wherein the first penetration part is an elongated hole extending in the second direction, and
the two or more coil lead wires held at the pair of elastic support pieces pass through the first penetration part.
4. The rotary electric machine as claimed in claim 3, wherein, when viewed in the axial direction, an entirety of a gap between the pair of elastic support pieces is overlapped with the first penetration part.
5. The rotary electric machine as claimed in claim 4, wherein the second penetration part is an elongated hole extending in the second direction, and
when viewed in the axial direction, the entirety of the gap between the pair of elastic support pieces is overlapped with the second penetration part.

6. The rotary electric machine as claimed in claim 1, wherein the elastic support pieces comprise two or more elastic support piece groups, the elastic support piece group comprising three or more elastic support pieces surrounding one coil lead wire.

7. The rotary electric machine as claimed in claim 6, wherein the holding part has:
- a pair of first protrusion parts, protruding from the connection part to the other side in the axial direction; and
- a pair of second protrusion parts, respectively connected with end parts on the other side of the pair of first protrusion parts in the axial direction, wherein each of the pair of second protrusion parts protrudes toward the other second protrusion part with respect to each other in a first direction intersecting with the axial direction, a slit extending in the first direction is provided at each of the pair of second protrusion parts, the slit splits, in a second direction, a tip end part of the second protrusion part in a protrusion direction, the second direction intersecting with the axial direction and orthogonal to the first direction, the elastic support piece group comprises four elastic support pieces, and the four elastic support pieces are respectively formed by two portions split in the second direction by the slit in one of the second protrusion parts and two portions split in the second direction by the slit in an other of the second protrusion parts.

8. The rotary electric machine as claimed in claim 1, wherein a plurality of conductive members are provided.

9. An electric actuator, comprising:
the rotary electric machine as claimed in claim 1; and
a transmission mechanism, linked with the rotor of the rotary electric machine.

10. A rotary electric machine, comprising:
a rotor, rotatable about a central axis extending in an axial direction as a center;
a stator, having a plurality of coils and facing the rotor via a gap;
a substrate, positioned on a side of the stator in the axial direction; and
a conductive member, attached to a surface of the substrate on an other side in the axial direction,
wherein the stator has a coil lead wire extending from the coils toward the side in the axial direction,
the conductive member has:
- a connection part, electrically connected with the substrate; and
- a holding part, having a plurality of elastic support pieces and connected with the connection part, the connection part has a first penetration part penetrating through the connection part in the axial direction, the substrate has a second penetration part penetrating through the substrate in the axial direction and, when viewed in the axial direction, overlapped with the first penetration part, the coil lead wire passes through the first penetration part and the second penetration part, the elastic support pieces comprise an elastic support piece group, the elastic support piece group comprising three or more elastic support pieces surrounding the coil lead wire, the coil lead wire is supported by the elastic support piece group on the other side in the axial direction with respect to the first penetration part, and each of the elastic support pieces comprised in the elastic support piece group contacts an outer peripheral surface of the coil lead wire, is positioned on the side in the axial direction toward the coil lead wire, and, in a state of being elastically deformed, presses the coil lead wire against other elastic support pieces.

* * * * *